July 31, 1956  G. E. MALLINCKRODT  2,756,728

DRIVE MECHANISM FOR ROTARY ENGINES AND THE LIKE

Filed Jan. 21, 1954  4 Sheets-Sheet 1

George E. Mallinckrodt,
Inventor.
Koenig and Pope,
Attorneys.

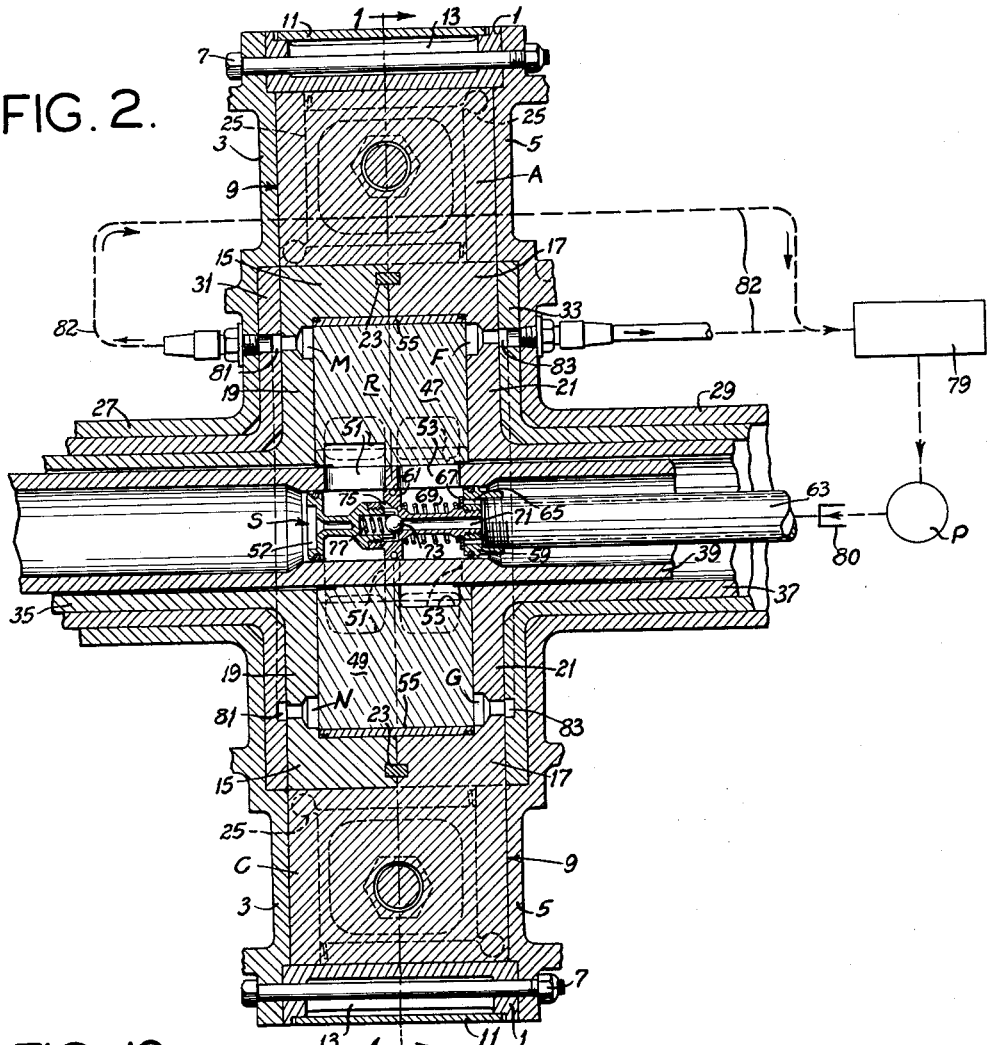

July 31, 1956  G. E. MALLINCKRODT  2,756,728
DRIVE MECHANISM FOR ROTARY ENGINES AND THE LIKE
Filed Jan. 21, 1954  4 Sheets-Sheet 3

George E. Mallinckrodt
Inventor
Koenig and Pope,
Attorneys.

July 31, 1956 G. E. MALLINCKRODT 2,756,728
DRIVE MECHANISM FOR ROTARY ENGINES AND THE LIKE
Filed Jan. 21, 1954 4 Sheets-Sheet 4

George E. Mallinckrodt,
Inventor.
Koenig and Pope,
Attorneys.

United States Patent Office 2,756,728
Patented July 31, 1956

2,756,728

DRIVE MECHANISM FOR ROTARY ENGINES AND THE LIKE

George E. Mallinckrodt, St. Louis, Mo.

Application January 21, 1954, Serial No. 405,371

18 Claims. (Cl. 123—11)

This invention relates to drive mechanisms for rotary engines and the like, and with regard to more specific features to a hydraulic differential drive mechanism adapted for improved coordinating action in an alternating-piston type rotary engine.

Among the several objects of the invention may be noted the provision of a reliable differential drive mechanism adapted to be built in compact form for comparatively large values of power transmitted; the provision of a mechanism of the class described which transmits its power hydraulically and without metal-to-metal contact and shock (as is the case in gear differentials) and without the generation of fatigue stresses (as is the case in spring differentials); the provision of a hydraulic type of differential drive adapted particularly to form a drive connection between the rotors on the one hand, and the power shaft on the other hand, of alternating-piston rotary engines; and the provision in an alternating-piston engine of a differential drive of the class described adapted to control the engine compression pressure as the engine speed increases by hydraulically transferring some of the momentum between engine rotors. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a cross-sectional view of a rotary engine incorporating my new differential drive, the entire system being shown in neutral position, and the view being taken on lines 1—1 of Figs. 2 and 3;

Fig. 2 is a vertical section taken on line 2—2 of Fig. 1;

Corresponding reference characters indicate corresponding parts throughout the several views of the drawings.

The stippling shown in Figs. 1 and 4–10 is arbitrary and for the purpose of diagrammatically distinguishing one connected set of pistons A, B, C, D and E from another connected set H, I, J, K and L.

Various types of differential drive mechanisms are known for various types of drives, including drives for alternating-piston rotary engines. For example, in my United States Patent 2,638,880 there is shown a gear-type differential for connecting the rotors of such a machine with its power shaft, and in my copending United States patent applications Serial No. 273,392, filed February 26, 1952, for Rotary Machine and Serial No. 372,222, filed August 4, 1953, for Piston-Type Machine are shown spring types of differential drive mechanisms for the same purpose. The present invention is an improvement upon such differential drive mechanisms, for alternating-piston rotary engines of the class described and for other uses.

In order that the departure of the present invention from what is known may be more clearly understood, I show the differential drive mechanism herein as applied to an alternative rotary piston-type engine of the type shown in Figs. 1–6 of said application Serial No. 273,392, so far as is concerned the number of pistons on the rotors, suction and exhaust porting and ignition system. Reference may therefore be made to the disclosure in said application Serial No. 273,392 (and the others mentioned) for any additional details desired.

Figure 1:
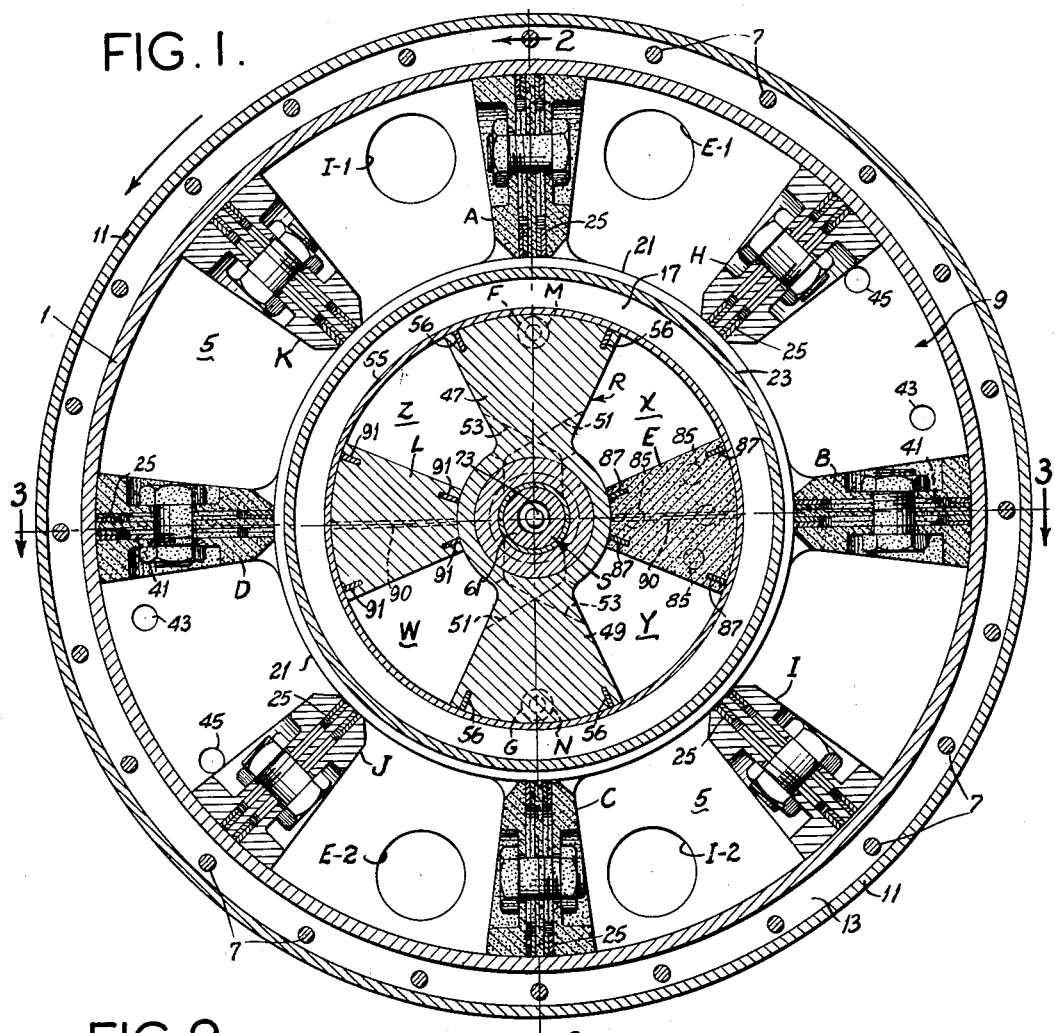
Figure 3:
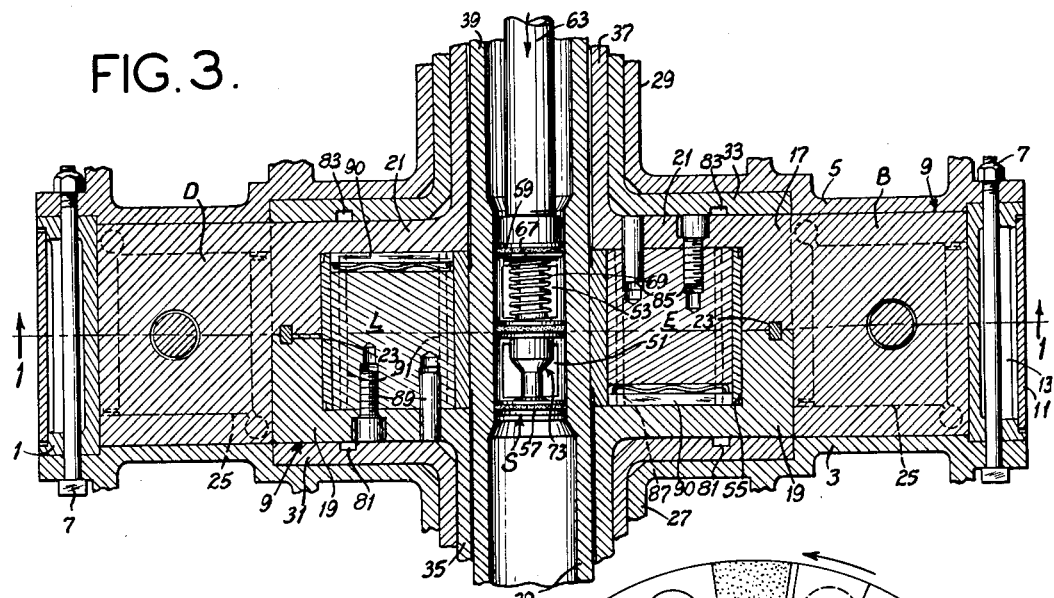
Fig. 3 is a horizontal section taken on line 3—3 of Fig. 1.

Referring now more particularly to Figs. 1–3 herein, numeral 1 indicates an outer ring having circular side cheek plates 3 and 5 held thereto by means of bolts 7 and forming what will hereinafter be referred to in general as a toroidal cylinder 9. An outer jacket 11 forms a peripheral water-cooling compartment 13. The inner surface of the toroidal cylinder 9 is formed by abutting rings or cup walls 15 and 17 of rotors 19 and 21, respectively. A sealing ring 23 in suitable facing grooves forms a seal between rings 15 and 17. Ring 17 of rotor 21 carries a sequence of power pistons A, B, C, D located in cylinder 9. Ring 15 of rotor 19 carries a sequence of power pistons H, I, J, K also located in cylinder 9. The pistons on the respective rotors interdigitate in the cylinder 9 in the sequence A, H, B, I, C, J, D, K (Fig. 1). Suitable sealing-ring assemblies 25 are employed on the respective pistons, further details of which are unnecessary to an understanding of the present invention but which may be found from said application Serial No. 372,222.

The cheek plates 3 and 5 are radial extensions of frame pieces 27 and 29, respectively. The rotors 19 and 21 are located within liners 31 and 33 within the frame pieces 27 and 29. The rotors include quills 35 and 37, respectively. These quills at their outer ends (not shown) carry appropriate reverse-locking mechanisms operative in connection with suitable cam tracks located at the outer ends of the frame pieces 27 and 29. The cam tracks and reverse-locking mechanisms are not shown, since their nature and purpose will be clear from said applications Serial Nos. 273,392 and 372,222.

The toroidal cylinder 9 has inlet ports I-1 and I-2, and exhaust ports E-1 and E-2; also ignition means 41, 43 and 45, as shown in said application Serial No. 273,-392. Briefly, the known construction thus far described operates as follows, referring to Figs. 1, 4 and 5.

At the instant of events illustrated in Fig. 1, the rotor 21 (including ring 17) is being held by the reverse-locking mechanism (not shown) against clockwise rotation in response to an explosive power event. Thus the power pistons A, B, C, D on rotor 21 are held stationary. The rotor 19 is being driven anticlockwise by simultaneous explosive power events between power pistons D and J, and H and B, respectively. Exhaust events are occurring from E-2 and E-1 between power pistons J and C, and A and H, respectively. Suction events through ports I-2 and I-1 are occurring between power pistons C and I, and A and K, respectively. Gas-buffered compression collision events are occurring between power pistons K and D, and I and B, respectively.

Figure 4:
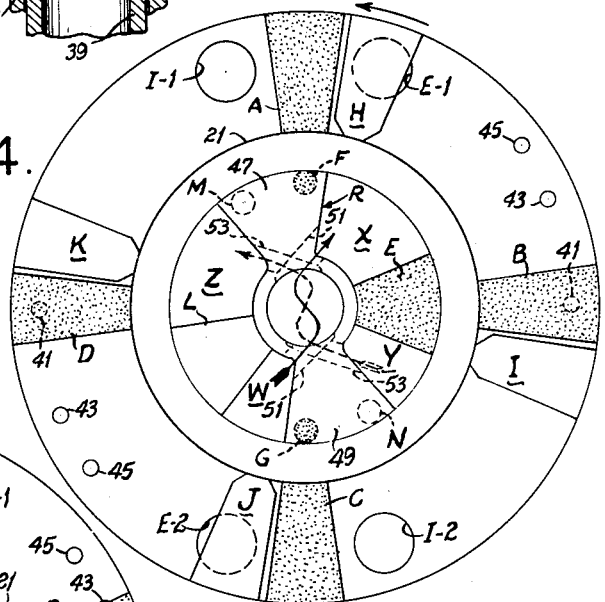
Fig. 4 is a diagrammatic view, based on Fig. 1 but showing the parts in an advanced position relative to that of Fig. 1.
Figure 5:
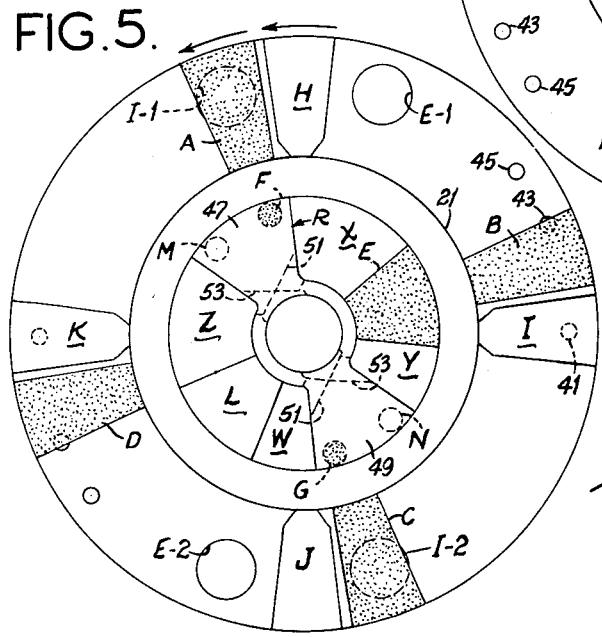
Fig. 5 is a view similar to Fig. 4, showing a succeeding position of parts.
Figure 6:
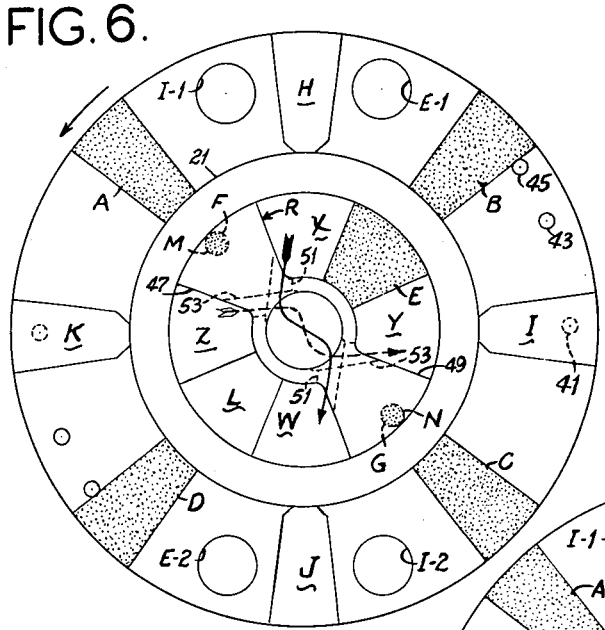
Fig. 6 is a view similar to Fig. 5, showing a next succeeding neutral position of parts.

Thus the parts described move to the positions shown in Fig. 4, whereupon the collision compression event between power pistons K and D, and I and B, respectively, moves forward the rotor 21 with its power pistons A, B, C, D (see Fig. 5). This is possible because by this time the explosive power event which held back power pistons A, B, C, D has been exhausted. The power pistons H, I, J, K of rotor 19 then assume the reverse-locked position. Then the succeeding explosive power event between power pistons K and D, and B and I, respectively, will drive the rotor 21 anticlockwise with its power pistons A, B, C, D. Hence ultimately the condition shown in Fig. 6 is reached in which the roles of power pistons A, B, C, D and H, I, J, K have been reversed relative to their roles in Fig. 1. The alternating roles of driver and reverse-locked reactor, as between power pistons A, B, C, D of rotor 21, and H, I, J, K of rotor 19 continues as long as the engine operates.

The present invention relates to delivering power from the thus alternately acting rotors 19 and 21 to a hollow power shaft or quill shown at 39. This is accomplished by attaching to the shaft 39 a symmetrical impeller R having opposite lobes 47 and 49. A peripheral liner 55 is located between the outer circular faces of the impeller and the inner circular forms of the rings 15 and 17. Thus a container is formed around shaft 39, containing the impeller R and a filling of hydraulic fluid. Running sealing means are indicated at 56, located between the ends of the impeller and the liner 55. However, no close sealing means are employed between the sides of the impeller and walls 19 and 21. At these points are running fits forming fair seals but permitting controlled leakage to ports M, N, F, G, to be described below. Ports 51 in one plane pass from one side of the impeller R to its other side and through the shaft 39. Ports 53 in another plane pass from said other side of the rotor to said one side and also through the shaft 39. Intercommunication between ports 51 and 53 is prevented by a spool S. This spool has end flanges 57 and 59 sealed to the inside of the shaft 39. It also has a central flange 61 sealed to the inside of the shaft 39 between the ports 51 and 53. A pipe 63 is threaded to the spool S and supplies a hydraulic fluid or force-transmitting medium to the spool. The spool has inlet ports 65 communicating between pipe 63 and impeller ports 53. A ring-type check valve 67, normally seated by means of a spring 69, serves to check reverse flow from port 53 to pipe 63. A central passage 71 in the spool also carries hydraulic fluid from pipe 63 to a second check valve 73 which has outlets 75 leading to ports 51. A spring 77 normally seats check valve 73 and prevents reverse flow from ports 53 to pipe 63. The shaft 39, pipe 63 and spool S rotate as an assembly. The pipe 63 is supplied with hydraulic fluid through a suitable packing gland from a pump P which receives its supply of hydraulic fluid from a sump 79. The gland is diagrammatically illustrated at 80. The sump 79 is a repository for hydraulic fluid leakage gathered in circular recesses 81 and 83 in the liners 31 and 33, respectively. The return circuit to the sump is designated 82.

Opposite ports M and N in the rotor 19 communicate with recess 81. Opposite ports F and G in the rotor 21 communicate with recess 83. When the ports are in the position shown in Fig. 1, ports M and N on rotor 19 are coaxial with ports F and G, respectively, on rotor 21, but they can move out of alignment (compare Figs. 1 and 4).

Rotor 21 carries a hydraulic driving piston E located in the space within liner 55 and on one side of the impeller R. The rotor attaching means are shown at 85. Sealing means between the end of driving piston E, liner 55 and impeller R are shown at 87. Rotor 19 carries a driving piston L located in the space within liner 55 and the other side of the impeller R. The attaching means are shown at 89. Sealing means between the end of driving piston L, liner 55 and impeller R are shown at 91. Side sealing means for both of pistons E and L are shown at 90. When the gas power pistons A, B, C, D of rotor 21 and the gas power pistons H, I, J, K of rotor 19 are in the symmetrical arrangement shown in Fig. 1, then the hydraulic driving pistons E and L are located opposite one another, and the ports F, G and M, N are coaxial, as shown in Fig. 1. The impeller then bisects the 180° angle between driving pistons E and L, being positioned symmetrically with respect to them and to the leakage ports M, N, F, G. The lobes of the impeller act as covers for these ports, controlling such leakage of pressure as can occur from opposite sides of the impeller to the ports. When the impeller is symmetrical relative to the driving pistons E and L, the leakage is equal from opposite sides of the impeller to the ports.

As the gas power pistons H, I, J, K progress counterclockwise, they move from the positions shown in Fig. 1 to the gas-buffered collision positions shown in Fig. 4, carrying with them the hydraulic piston L. This squeezes the hydraulic medium from space or chamber W to space or chamber X on the opposite side of the impeller. Thus pressure is applied to two sides of the impeller in applying torque thereto. The appropriate flow is indicated by the solid, curved dart in Fig. 4. The nature of this flow will be understood by considering first the position of parts in Fig. 1. Upon movement of the piston L, flow takes place from compartment W to compartment X, and in doing so, both lobes 47 and 49 of impeller R are forced to move equally. While the movement of piston L tends to decrease the volume in compartment W, the movement of lobe 49 tends to increase the volume in this same compartment. Also, the equal movement of lobe 47 tends to increase the volume of compartment X at the same rate that movement of lobe 49 tends to increase the volume of compartment W. Thus the volume available for fluid being displaced by the piston L is not merely the increase in volume of compartment X, but the increase in volume of both compartments W and X, due to the equal movements of lobes 49 and 47, respectively, on impeller R. Thus only one-half of any unit volume displaced by the piston L flows to compartment X, the remaining half-unit volume being accommodated in compartment W, due to recessive action of the lobe 49. Obviously, while the piston L moves, the impeller R will at all times move one-half the distance of the movement of piston L. As a result, the impeller will take up new positions bisecting the angle between driving pistons E and L, as indicated for example in said Fig. 4. Due to the movement of the impeller, hydraulic fluid tends also to be squeezed from space or chamber Y while pressing on driving piston E, as shown by the dotted, curved dart of Fig. 4. At the same time fluid is communicated through ports 53 to the opposite space or chamber Z (see the dotted curved dart). Thus, upon a unit displacement of the piston L, lobes 47 and 49 of impeller R displace one-half unit, as made clear above. The increase in volume of compartment Z (due to the relative movement of piston L with respect to lobe 47) is equal to the decrease in volume of compartment Y (as determined by the movement of lobe 49 relative to stationary piston E). Thus the movement of lobe 49 relative to stationary piston E (which determines the decrease in volume of compartment Y) is equal to the movement of piston L relative to lobe 47 (which determines the increase in volume of compartment Z). During this process the leakage ports M, N in rotor 19 have advanced from their coaxial positions relative to ports F and G, as shown in Fig. 1, to the separated position shown in Fig. 4. The impeller R normally maintains a symmetrical position relative to all of the group of leakage ports F, G, M, N. Thus, normally, although the leakage paths have shortened from each of spaces Z and X to ports M and F, respectively, and from spaces W and Y to ports G and N, respectively, these paths all remain equal in magnitude. The spaces W, X, Y, Z may be referred to as variable-volume chambers. The porting 51, 53 between them may be referred to as cross-port means.

Next (Figs. 4 and 5) the gas compression, due to the collision events between power pistons K and D, and B and I, becomes sufficient to overcome the reverse-holding action on power pistons D and H of the exhausting charge between power pistons D and J, and H and B. The entire systems of pistons A, B, C, D, E and H, I, J, K, L then move as a unit as momentum is interchanged by the collision event through the compressed gas, as may be seen by comparing Figs. 4 and 5. It will thus be apparent that there is a gas-buffered collision event between pistons K and D, and B and I which does not involve direct contact between K and D or between B and I. The relationship between driving pistons L and E and impeller R remains the same, with R continuing to bisect L and E.

Next, the position shown in Fig. 6 is reached, wherein the roles and positions of power pistons A, B, C, D and power pistons H, I, J, K have been interchanged, the latter being reverse-locked and the former passing through a cycle of power events, as above described. This has resulted in driving piston E forcing hydraulic fluid from chamber X to chamber W, as shown by the solid dart, thus applying torque to the two faces of the impeller R. This doubles the torque on R. Fluid also flows from chamber Z to chamber Y, as shown by the dotted dart. It will be noted that as the driving pistons L and E separate relatively, the impeller R still maintains a bisecting position.

For a given power generated by the rotors 19 and 21 and flowing to the shaft 39, the torque delivered from the variable-speed rotors 19, 21 to the impeller R and shaft 39 is doubled so that the rotor speed at all times assumes an angular velocity equal to the average of the instantaneous angular velocities of the rotors. Thus, the impeller R normally maintains an average position bisecting the positions of the driving pistons E and L (compare Figs. 1, 4, 5 and 6).

Even without the ports M, N, F, G, gradual leakage of hydraulic fluid could be expected from or between the spaces W, X, Y, Z. This would result in the rotor R drifting from the required bisecting position between driving pistons E and L. Thus ultimately the driving process might break down. It is to forestall this contingency that the leakage ports M, N, F, G are employed. They will now be discussed in connection with Figs. 7 and 8.

Figure 7:
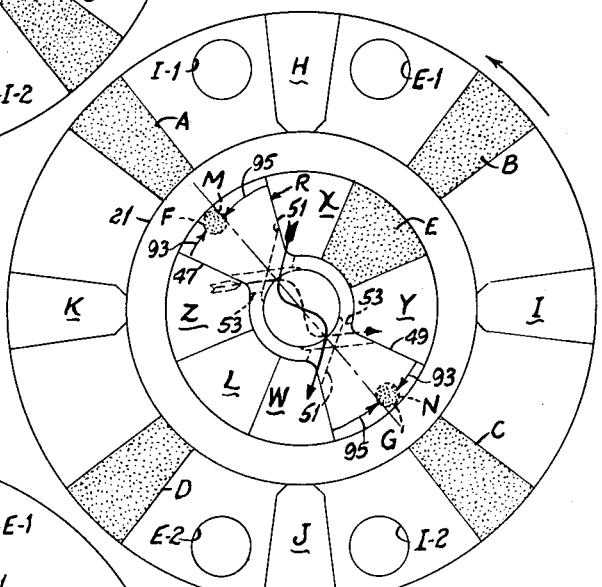
Fig. 7 is a view which is the same as that of Fig. 6, except that it illustrates a compensating impeller action.

In Fig. 7, assume that some leakage has occurred from space X, tending to unbalance the forces on impeller R so that it has drifted slightly in a relatively clockwise or lagging direction from the Fig. 6 to the Fig. 7 position. This causes the leakage path 95 from chamber X to port M to become greater than the shortened leakage path 93 from chamber Z to port F, ports F and M being coaxially located. A similar condition exists between a similarly lengthened leakage path 95 between chamber W and port N, as compared to shortened leakage path 93 between chamber Y and port G. Since the friction against leakage over the long paths 95 is greater than the friction over the short paths 93, the leakage will be reduced along these paths 95 and the pressures will tend to build up in chambers X and W. This overcomes the faster leaking pressure in chambers Z and Y due to the shorter leakage paths 93, thus tending to restore the impeller R to a bisecting position with respect to the driving pistons E and L. The restorative action occurs automatically whenever the need for it incipiently arises.

Figure 8:
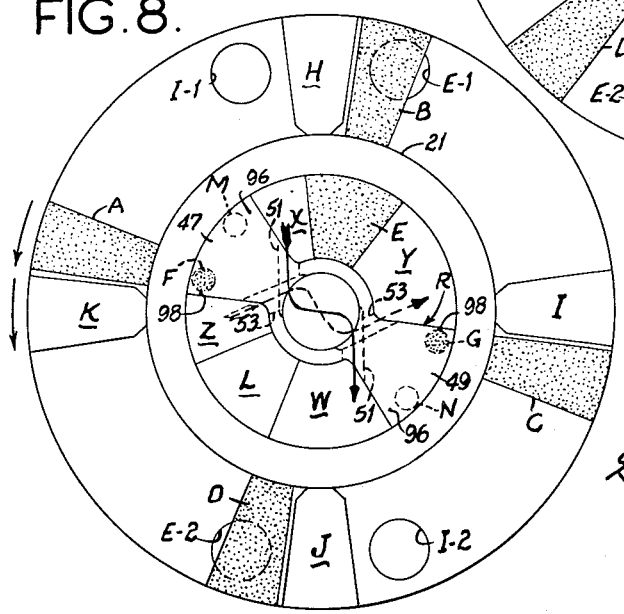
Fig. 8 is a view similar to that of Fig. 6, showing a succeeding position of parts and again illustrating a compensating impeller action.

In Fig. 8 is shown a position of parts advanced from that of Figs. 6 and 7, wherein the power pistons A, B, C, D have advanced toward the now reverse-locked power pistons H, I, J, K. This occurs in performing a second cycle of power expansion, exhaust, suction and collision compression events. Note that each cycle of power events requires 45° of motion. Thus in Fig. 8 we have the same set of conditions as illustrated in Fig. 4, except that in Fig. 8 power pistons A, B, C, D are under power thrust instead of power pistons H, I, J, K, as in Fig. 4. But again hydraulic fluid is being compressed from chamber X to chamber W (see the solid curved dart) and fluid is being compressed from chamber Z to chamber Y (see the dotted curved dart). Torque-producing force is being applied to two faces of the impeller R, which is moving at the average speed of rotors 19 and 21 and maintains its essentially bisected position between driving pistons E and L.

In Fig. 8 the same incipient clockwise drift under leakage has been shown for impeller R, as shown in Fig. 7. Again it will be noted that the leakage paths from chambers X and W to ports M and N have increased as again shown by the relatively long leakage paths 96. The leakage paths from chambers Z and Y to ports F and G have decreased, as shown at 98. Thus the pressure tends to build up in chambers X and W, restoring impeller R to a position substantially bisecting the positions of the driving pistons E and L.

While the above illustrations show clockwise drifts of impeller R, similar restoration would occur upon anticlockwise drift, since the resulting long and short leakage paths would reverse their positions.

In view of the above, it will be seen that the impeller R always tends to assume a position very nearly bisecting the angle between driving pistons E and L. Therefore, its angular velocity will at all times be substantially equal to the average of the velocities of pistons E and L and of the connected rotors 19 and 21. The velocities of the latter are controlled by the power events between the groups of power pistons A, B, C, D (on rotor 21) and H, I, J, K (on rotor 19). The result is that the power shaft 39, which has on it the usual flywheel to prevent velocity fluctuations, operates at a substantially constant speed, equal to the average of the instantaneous velocities of the rotors. Two special conditions may be noted for a complete understanding. First, when one rotor is stationary the impeller R moves at half the speed of the other, which is the average, or one-half of the sum of their speeds (Figs. 4 and 8, for example). Second, when both rotors move at the same speed (Figs. 5 and 8, for example), the impeller R moves at the same speed, which again is the average, or one-half of the sum of their speeds. At all other times the speed of impeller R is also the average, or one-half of the sum of the speeds of the rotors. It will be understood that the deviations of the impeller R from a bisecting position between driving pistons E and L, as shown in Figs. 7 and 8, which bring about the restorative forces, are incipient and bring about no substantial variation from the stated rule, and that the speed of the power shaft is substantially the average of the speeds of the rotors 19 and 21. This average is substantially constant when the usual power shaft flywheel is used, as already stated.

Further description of the cyclic operation is not necessary, since it will be seen from the above that after four cycles of power events, such as illustrated in Figs. 1–6, the parts are restored to the arrangement illustrated in Fig. 1.

The purpose of the pump P is only to supply make-up against leakage of hydraulic fluid. It does not supply any substantial driving pressure. Note in this connection the check valves 67 and 73, which hold back application of driving pressures against the pump P. In this connection it will be noticed that between driving events that occur between driving pistons E and L and the impeller R, there are intervals of pressure reductions under which the pressure from pump P can make up fluid by opening the check valve 67 or 73, as the case may be.

It will be noted that the cross communications between chambers W and X, and Y and Z, respectively, tend to equalize pressures in these pairs, thus doubling the torque on impeller R for a given torque applied by a given rotor. Since work done is proportional to torque, multiplied by velocity, and the indicated work input of the machine is equal to its brake work output (minus friction), it is for this reason that the speed of the impeller R will not equal the sum of the speeds of the rotors, but will substantially equal one-half this sum, which is to say, their average.

Figure 9:
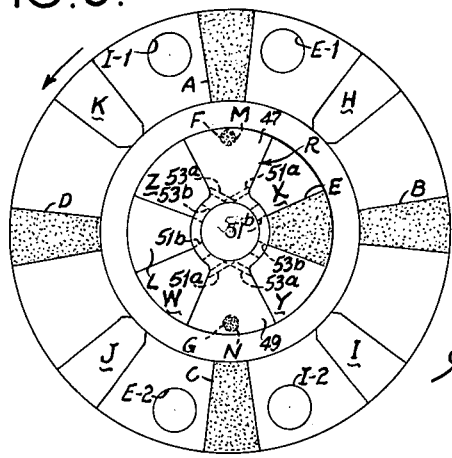
Fig. 9 is a diagrammatic view similar to Fig. 1, illustrating an alternative form of the invention; and, Fig. 10 is a view of said alternative form similar to Fig. 9 but showing a succeeding arrangement of parts.

In Figs. 9 and 10 is shown an alternative form of the invention in which like numerals indicate like parts. In this form of the invention (referring to Fig. 9) the ports 51 and 53 are reduced to throttling size, as shown at 51$^a$ and 53$^a$. Ports 51$^a$ are augmented (in the same planes, as respects the spool S) by ports 51$^b$. Ports 53$^a$ are augmented (in the same planes, as respects spool S) by ports 53$^b$. The ports 51$^a$ and 53$^a$ are not large enough rapidly to perform the hydraulic fluid transfer functions above described. However, the combination or sum of ports 51$^a$, 51$^b$ (on the one hand) and of ports 53$^a$, 53$^b$ (on the other hand) is sufficient to do so, but only at the beginning of a cycle of power events, as illustrated in Fig. 9. As a cycle of events proceeds, as illustrated in Fig. 10, cross flow between spaces W and X, and Y and Z, is increasingly throttled. Note that as between Figs. 9 and 10 the pistons L and E during movement gradually cover the ports 51$^b$ and 53$^b$. Power then tends to be delivered from the rotors to the impeller R increasingly closer to a 1:1 torque ratio from the driving pistons E and L. The result is that the momentum transfer between rotors 19 and 21 occurs only in part through the gas-buffered collision events between the power pistons on the rotors. The remainder occurs by force transfer from one driving piston (say L) directly to the other driving piston (say E) via the nonyielding substantially trapped liquid and rotor lobe between them. In this connection see Fig. 10, wherein L closes 51$^b$, E closes 53$^b$, and liquid is essentially trapped in W and Y on opposite sides of one rotor lobe. The presence of the small ports 51$^a$ and 53$^a$ affords only small pressure relief for W and Y, and it is to be understood that these 51$^a$ and 53$^a$ ports may under some circumstances be eliminated entirely. This relieves the power pistons, for example, K and D, and H and I, in Figs. 9 and 10, of some of the torque transfer which otherwise would take place through the compressed gas located between these pistons during the gas-buffered collision events occurring between them. In other words, some of the torque is transferred by a throttle-buffered hydraulic collision event between the hydraulic pistons. The result is that at a given engine speed its gas compression pressure is reduced or controlled.

It may be mentioned that an alternating-piston rotary engine of the type herein under consideration normally has an increasing compression pressure with increase in speed. This is due to the fact that this pressure is a function of the amount of exchange of momentum between the rotor systems such as connected to rotors 19 and 21. By means of the form of the invention shown in Figs. 9 and 10, this momentum interchange with speed increase is increasingly hydraulically effected through the pistons E, L and impeller R, rather than increasingly by the gas-buffered collision events between the gas power pistons.

It will be apparent that at higher speeds a given throttling across ports 51$^b$ or 53$^b$ will result in a larger pressure differential between chambers such as W and X or Y and Z than at lower speeds. Stated otherwise, the process of doubling the torque on the impeller R is interfered with to a greater extent at higher speeds than at lower speeds. As a consequence, at higher speeds the hydraulic connections between driving pistons E and L and the impeller R effect a larger proportion of the momentum transfer than at low speeds. The converse is also true. The end result is that, by means of the invention, compression pressures at higher speeds of engines of this type may be controlled by appropriate design of the cross ports 51 and 53, as illustrated in connection with the porting 51$^a$ and 51$^b$, 53$^a$ and 53$^b$, as shown in Figs. 9 and 10.

Another advantage of the form of the invention shown in Figs. 9 and 10 is as follows: If in prior-art engines the velocity of a power piston is plotted against time, a simple harmonic motion waveform of curve is approximated, whereas it is desired that this wave more closely approximate a square form, i. e., one in which the acceleration at the beginning and the deceleration at the end of the motion are more rapid. The present machine, employing the construction of Figs. 9 and 10, more closely approximates such a square wave form when velocity is plotted against time. This substantially increases the thermodynamic efficiency of the engine over a wide range of speeds.

It will be understood that the invention is not limited in its application to rotors having four gas power pistons each as illustrated herein, but that rotors with two, six, eight and other numbers of power pistons may be employed with substantially the same differential drive mechanism having at least one impeller and at least two driving pistons. The only difference will be that the angle of advance per cycle of operations will vary. Thus for the four-piston machine shown the angle of advance is 90°; for a two-piston machine it would be 180°; for a six-piston machine 60°; and for an eight-piston machine 45°.

From the above, it will also be seen that other advantages accrue, such as the provision in a machine of this type of a differential drive of very simple, reliable and compact form, involving no shock loads between metal parts (as in the case of gear teeth) or the stressing of any parts by substantial deflections (such as in the case of springs).

Another advantage of the invention is that it serves as a convenient means for cranking an alternating-piston engine for starting purposes, since by applying power to the shaft 39 the driving pistons L and E may be driven from the impeller R, so as to rotate the respective sets of pistons on the rotors 19 and 21 with incipient accelerations and decelerations gradually increased in the known manner until automatic power operation is initiated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A hydraulic differential drive mechanism comprising a power shaft, a container for a fluid force-transmitting medium, impeller means connected with the shaft and having first and second connected lobes movable in said container and dividing the same into two compartments, first and second independently movable driving pistons respectively located and movable in said compartments and dividing each compartment into two spaces, means providing a fluid connection from the space between the first lobe and first piston to the space between the second lobe and the second piston, and means providing a separate fluid connection from the space between the first lobe and the second piston to the space between the second lobe and the first piston.

2. A hydraulic differential drive mechanism comprising a power shaft, a container for a fluid force-transmitting medium, impeller means connected with the shaft and having first and second angularly opposite connected lobes movable in said fluid container and dividing the same into two compartments, first and second independently movable power pistons respectively located and movable in said compartments and dividing each compartment into two spaces, means providing a fluid connection from the space between the first lobe and first piston to the space between the second lobe and the second piston, means providing a separate fluid connection from the space between the first lobe and the second piston to the space between the second lobe and the first piston, and leakage port means respectively moving with the pistons and normally symmetrically covered by the impeller and adapted to effect differential leakage from opposite sides of the impeller when the impeller unsymmetrically covers the ports, whereby the impeller is biased from any abnormal unsymmetrical position relative to the pistons and ports to a symmetrical position relative thereto.

3. A hydraulic differential drive mechanism comprising a power shaft, container means surrounding the shaft and containing a fluid force-transmitting medium, impeller means attached to the shaft and having first and second angularly opposite lobes in said container means and having sliding sealing engagements therewith, first and second independently movable pistons in the container means and also having sliding sealing engagements therewith and normally symmetrically angled relative to the impeller, means providing a cross connection from the space between the first lobe and first piston to the space between the second lobe and the second piston, and means providing an independent connection from the space between the first lobe and the second piston to the space between the second lobe and the first piston.

4. A hydraulic differential drive mechanism made according to claim 3, including means adapted to introduce fluid independently into the respectively connected pairs of spaces.

5. A hydraulic differential drive mechanism made according to claim 4, including leakage port means respectively movable with said pistons, said port means being covered and controlled by the impeller and being normally angularly symmetrically arranged with respect to the impeller when the latter is angularly symmetrically related to the pistons, whereby the impeller is biased from any abnormal unsymmetrical position relative to the port means and pistons by unequalized pressure on opposite sides of a lobe to be restored to its symmetrical position.

6. A hydraulic differential drive mechanism comprising a power shaft, a circular container surrounding said shaft and containing a fluid force-transmitting medium, a rotary impeller located in said container and connected with said shaft, said impeller having symmetrical opposite lobes dividing said container into two compartments, independently movable pistons in the container one of which is located in each compartment and both being normally symmetrically angled relative to the impeller, each compartment being thereby divided into two divisions each of which is substantially opposite a division in the other compartment, said impeller, pistons and container having sliding seals, and means providing independent cross passages between oppositely located divisions of the compartments.

7. A hydraulic differential drive made according to claim 6, including leakage port means covered and controlled by the impeller and respectively arranged for movements with the respective pistons and normally angularly symmetrically arranged with respect to the impeller when the latter is angularly symmetrically related to the pistons.

8. A hydraulic drive mechanism for use as a drive between the rotors and power shaft of an alternating-piston engine wherein gas-buffered collision events between the power pistons on the rotors serve to transfer momentum between the rotors; comprising a container for a force-transmitting medium, impeller means connected with the power shaft and having first and second connected lobes movable in said container and dividing the same into two compartments, first and second driving pistons respectively located and movable in said compartments and dividing each compartment into two spaces, the respective driving pistons being attached to the respective rotors, means providing a fluid connection from the space between the first lobe and the first driving piston to the space between the second lobe and the second driving piston, and means providing a separate fluid connection from the space between the first lobe and the second driving piston to the space between the second lobe and the first driving piston.

9. Apparatus made according to claim 8, wherein said fluid connections are so located in the impeller as to be crossed and increasingly covered by said driving pistons in their movements relative to the impeller, whereby increasing throttling action on fluid passing through said connections is effected by advancing piston movements relative to the impeller and some of the momentum transfer between rotors is accomplished by liquid-transmitted force between said driving pistons on the rotors so as to limit pressure occurring during gas-buffered collision events between said power pistons on the rotors.

10. A hydraulic differential drive mechanism comprising a power shaft, a circular liquid container located around said shaft, an impeller connected with the shaft and having oppositely disposed lobes in the container and having a running sealing engagement therewith, relatively movable rotors each of which has a driving piston in the container and having a running sealing engagement therewith, the respective pistons being located on opposite sides of the impeller and forming with said lobes four liquid-containing spaces which are substantially oppositely located, and independent liquid connections between the pairs of oppositely located spaces, whereby a given angular movement of one piston with respect to the other when stationary results in one-half said given angular movement by the impeller, whereby in the absence of liquid leakage from the spaces the impeller and the two pistons will maintain a substantially symmetrical relationship.

11. A hydraulic differential drive mechanism made according to claim 10, including means for supplying liquid at independent inlets to said pairs of cross-connected spaces so as to make up any leakage which may occur therefrom.

12. A hydraulic differential drive mechanism made according to claim 11, wherein said rotors carry controllable liquid leakage outlets communicating with said container at relatively movable positions adapted to be substantially covered by the impeller in any relative positions of said outlets, whereby differential leakage is effected from spaces on opposite sides of the impeller to compensate for any tendency for it to assume a nonsymmetrical relationship to the driving pistons.

13. Rotary apparatus comprising an assembly of at least two cooperating rotary power systems having power pistons, wherein alternately each system advances upon the other to effect a gas-buffered collision event between power pistons, and means forming part of the assembly including driving pistons respectively located on the systems and cooperating through a liquid medium to produce a liquid-buffered collision event between the systems during the occurrence of said gas-buffered collision event.

14. A rotary engine comprising an assembly of at least two cooperating rotary driving systems having power pistons, wherein each system moves at varying instantaneous angular velocities, a power shaft, and hydraulic means connecting said systems with said shaft and being adapted to transmit power from said driving systems to said shaft at instantaneous angular velocities of the shaft substantially equal to one-half the sum of the instantaneous angular velocities of said power systems.

15. A rotary engine comprising an assembly of at least two cooperating rotary driving systems having power pistons, wherein alternately each system advances upon the other to effect a gas-buffered collision event between power pistons with resulting variations in instantaneous angular velocities of the systems, a shaft adapted to be driven by the driving systems, and hydraulic means connecting both systems with said shaft and adapted hydraulically to transmit power from said systems to said shaft at an angular velocity at any instant substantially equal to one-half the sum of the instantaneous angular velocities of said power systems.

16. A rotary engine made according to claim 15, wherein said hydraulic means comprises a container, an impeller on the shaft in the container, driving pistons in the container and located on the rotary systems respectively and cooperating with said impeller through liquid-filled, variable-volume chambers established by the impeller and driving pistons respectively.

17. A rotary engine made according to claim 16, including cross-port means between said chambers whereby common hydraulic pressure may be established in two compartments and applied therefrom to the impeller so as to double the torque thereon.

18. A rotary engine comprising an assembly of at least two cooperating rotary driving systems having power pistons, wherein alternately each system advances upon the other to effect a gas-buffered collision event between power pistons with resulting variations in instantaneous angular velocities of the power systems, a power shaft, hydraulic means connecting said systems with said shaft and comprising a liquid-filled container, an impeller on the shaft and located in the container, driving pistons in the container and located on the rotary systems respectively and cooperating with said impeller through liquid-filled, variable-volume chambers established by the impeller and driving pistons respectively, and cross-port means between said chambers, whereby common hydraulic pressure may be established in two compartments and applied to the impeller so as to double the torque thereon and substantially to halve its velocity relative to the sum of the instantaneous angular velocities of said systems.

No references cited.